United States Patent [19]

Blumer et al.

[11] Patent Number: 4,469,210
[45] Date of Patent: Sep. 4, 1984

[54] ROTARY CHUTE FOR SPREADER

[75] Inventors: John E. Blumer, Beatrice; Arthur F. Linsenmeyer, Wymore, both of Nebr.

[73] Assignee: Dempster Industries Inc., Beatrice, Nebr.

[21] Appl. No.: 412,981

[22] Filed: Aug. 30, 1982

[51] Int. Cl.$^3$ .............................................. B65G 11/00
[52] U.S. Cl. ........................................ 193/22; 193/29; 239/666; 239/676; 239/687
[58] Field of Search ............... 239/687, 666, 672, 674, 239/676; 193/22, 23, 29; 406/160, 161, 162; 414/293, 301, 303

[56] References Cited
U.S. PATENT DOCUMENTS

| | | | |
|---|---|---|---|
| 3,151,720 | 10/1964 | Orr et al. | 406/162 X |
| 3,232,626 | 2/1966 | Polzin | 239/687 X |
| 3,490,618 | 1/1970 | Buschbom | 239/687 X |
| 3,559,894 | 2/1971 | Murray et al. | 239/676 X |
| 4,272,028 | 6/1981 | Cobb | 239/687 |

Primary Examiner—John J. Love
Assistant Examiner—Mary F. McCarthy
Attorney, Agent, or Firm—Hugh D. Jaeger

[57] ABSTRACT

Rotary chute for a spreader where the chute is rotationally adjustable about a spinner axis of a spreader where at any rotational position selected for the chute, the overall geometric relationship of the spinner and chute are geometrically symmetrical. The rotary chute spreads dry material such as fertilizer, lime, salt or the like onto a spinner of the spreader, the spinner including a conical spinner cone mounted on a spinner disc, and a plurality of spinner vanes, the spinner vanes being channeled members. The first rotary chute is for a pull-mounted configuration including a configured baffle and vane configuration internal to an inner ring which rotates within an outer ring. A handle is provided for rotating the inner ring within the outer ring including a direction pointer and directional plate indicating the angular degree of the path of spread material. A second rotary chute is intended for use with a vehicle spreader system and includes a configured baffle mounted in an inner ring which rotates within an outer ring. The adjustable chute provides correct pattern distribution of spread material.

8 Claims, 8 Drawing Figures

ROTARY CHUTE FOR SPREADER

BACKGROUND OF THE INVENTION

1. Field of the Invention

The present invention pertains to dry material spreaders and, more particularly, pertains to an adjustable rotary chute spreader for spreading of dry material such as fertilizer, lime, salt or the like in a predetermined distribution path of dry material.

2. Description of the Prior Art

Prior art spreaders incorporating conical spinners and chutes for guiding the material to the conical spinners from either the conveyor chain or conveyor belt have failed to adequately provide for predetermined even and equal distribution, let alone adjustable distribution of material over a predetermined swath. Prior art spreaders have usually deposited the material with a relatively narrow band or an even band with little regard to the distribution swath and pattern and the density of material spread over that particular area of distribution. Due to the cost of dry material being spread, such as fertilizer, which has been increasing in price as petroleum has been increasing, the importance of even distribution has now become an even more significant prior art problem with the prior art spreaders being less than satisfactory in helping to eliminate this problem.

The prior art has become especially more critical with the importance of fertilizing with dry material of corn or other cash crops where fertilizer has to be particularly accurate for achieving maximum yields.

Prior art spreaders have failed to allow for any adjustability of a chute about the spinner cone, let alone any rotational adjustability. Prior art chutes have failed to allow for precise adjustment of the spread patterns of the swath to provide uniformity and equalized distribution of the spread material The present invention overcomes the deficiencies of the prior art by providing an adjustable, infinitely positioning rotary chute thereby providing uniform and equalized predetermined pattern distribution of material from a spreader. The practice of blending herbicides into dry fertilizer material is a newly developing technology which requires very close control of application rates so as to avoid any overdoses.

SUMMARY OF THE INVENTION

The general purpose of the present invention is a rotary chute which is mechanically or electromechanically or hydraulically adjustable, being rear mounted at the end of a spreader box and having a baffle or plurality of baffles which are adjustable about a conical spinner disc of a spinner providing for a predetermined degree of pattern control of the distribution of dry material such as fertilizer, lime, salt or the like. The rotary chute can be affixed either to a vehicle-propelled spreader such as a truck mounted spreader or to a vehicle-pulled spreader such as the "Clipper" pull spreaders manufactured by Dempster Industries of Beatrice, Nebr.

According to one embodiment of the present invention, there is provided a rotary chute for use with a dry material spreader, the dry material spreader including a hopper, chassis supporting the hopper, plurality of tires supporting the chassis, and an adjustable gate positioned on the rear of the hopper, a conveyor chain or belt running the longitudinal length through a lower portion of the hopper, a conveyor sprocket and gearbox coupled to a drive mechanism, a spinner disc including a conical member having a central disc cone and spinner vanes positioned thereabout the conical member of the spinner, the spinner connected to the gearbox, and the rotary chute including an upper chute assembly with an outer ring, three elongated holes positioned about the ring, an upper support assembly including angular members and a partial cylindrical member, chute extensions extending from the angular members, and triangular sides affixed between the angular members and the chute extensions, an inner ring including like elongated holes, at least one chute and a configured baffle affixed between the chute and the inner ring, a chute adjustment handle positioned to a lower portion of the inner ring, a directional indicator pointer positioned on the outer ring and a directional indicator plate positioned on the inner ring, with bolts extending between said elongated holes whereby the handle rotates the inner ring supporting the configured chute baffle and positions the chute baffle about the conical spinner as well as the spinner disc, thereby providing for predetermined and equalized pattern distribution of dry material for the rotary chute with discrete fixed-position spinner vanes on the spinner disc.

According to another embodiment of the present invention, there is provided a rotary chute for use with a spreader where the geometrically configured baffle configuration is positioned internal to an outer ring member which rotates about an internal inner ring circumferential member in a geometrical configuration relationship opposite to that as described above. The outer ring rotates about three bolts with elongated holes in the outer ring, handles provide for movement, and baffles are carried in a lower portion of the outer ring.

In either embodiment, the chute can also be manually adjustable or the like, and the spinner can attach to the drive shaft of a hydraulic motor. Other like rotational structure can be used in lieu of the elongated holes.

One significant aspect and feature of the present invention is to provide a rotary chute for positioning about an axis of a conical disc of a spinner of a dry material spreader where the chute is rotationally adjustable about the spinner axis and thus at any rotational position selected, the overall geometric relationship of the spinner and chute are identical.

Another significant aspect and feature of the present invention is to provide a rotary chute for vehicle mounted spreaders as well as vehicle pulled spreaders.

A further significant aspect and feature of the present invention is to provide a rotary chute spreader which is infinitely adjustable by just loosening of a wing nut and moving an inner ring supporting a baffle assembly with respect to the outer ring secured to the spreader.

An additional significant aspect and feature of the present invention is to provide a rotary chute spreader which is infinitely adjustable by moving an outer ring supporting a geometrically configured baffle assembly including at least one baffle, and more so, a baffle with side baffles forming an assembly and secured internal to the outer ring by welding or the like for depositing material at a predetermined point about a conical spreader for distribution by the spreader vanes. Rotational adjustment is significant because the geometrical relationship between the spinner and the chute is a determining factor.

Having thus described embodiments of the present invention, it is a principal object hereof to provide a rotary chute spreader.

One object of the present invention is to provide a rotary chute which is rotationally adjustable around the spinner axis, and thus at any rotational position selected for the chute, the overall geometric relationship of the rotary chute with respect to the spinner, spinner conical disc and spinner veins are symmetrical and identical.

Another object of the present invention is a rotary chute which can be adjusted in the field and does not require any tools, just the mere loosening and tightening of a wing nut.

An additional object of the present invention is to provide a rotary chute which can be utilized on either pull-type spreaders or vehicle-mounted spreaders. The chute is configured such that one version of the chute may be applicable to one type of spreader structure while another version of the chute may be applicable to another type of spreader structure. The theory and operation of rotary chutes is essentially based on the premise of baffles carried by a ring which rotates about a second ring, the first ring carrying the baffles which are a predetermined geometrical configuration depositing of material about a conical spreader cone for spreading by vanes of the spreader.

A further object of the present invention is to provide a rotary chute which can be coupled to a control device which will automatically position the chute at the optimum position with respect to the factors such as gate opening, ground speed, and the like.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts through the figures thereof and wherein.

DESCRIPTION OF PREFERRED EMBODIMENTS

Figure 1:
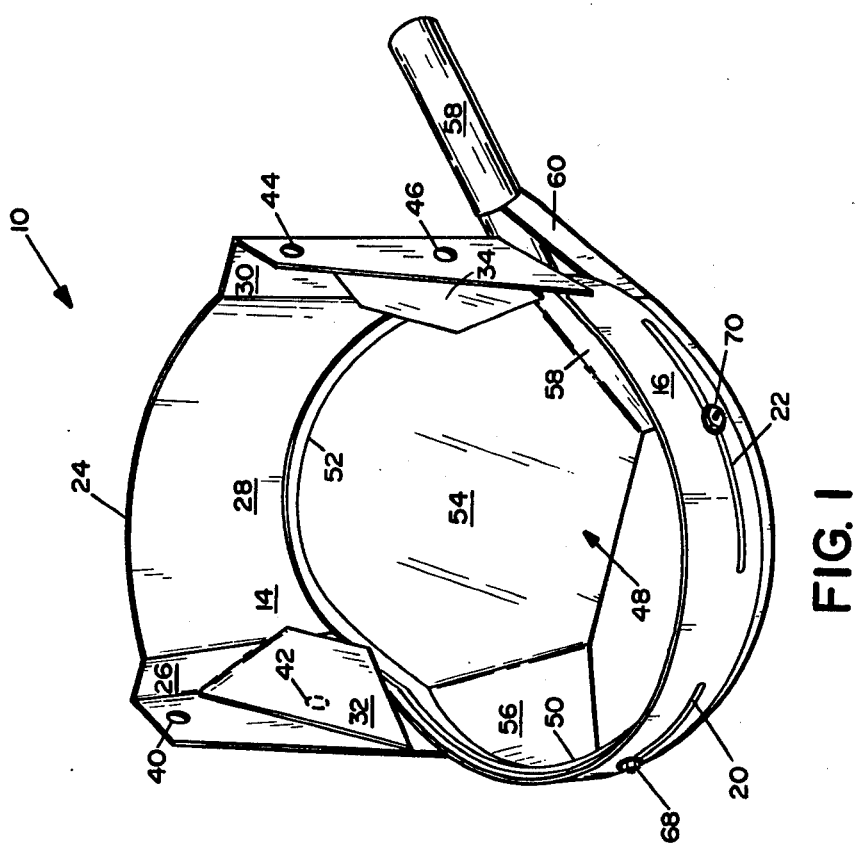
FIG. 1 illustrates a perspective view of a rotary chute, the present invention, for a spreader.
Figure 3:
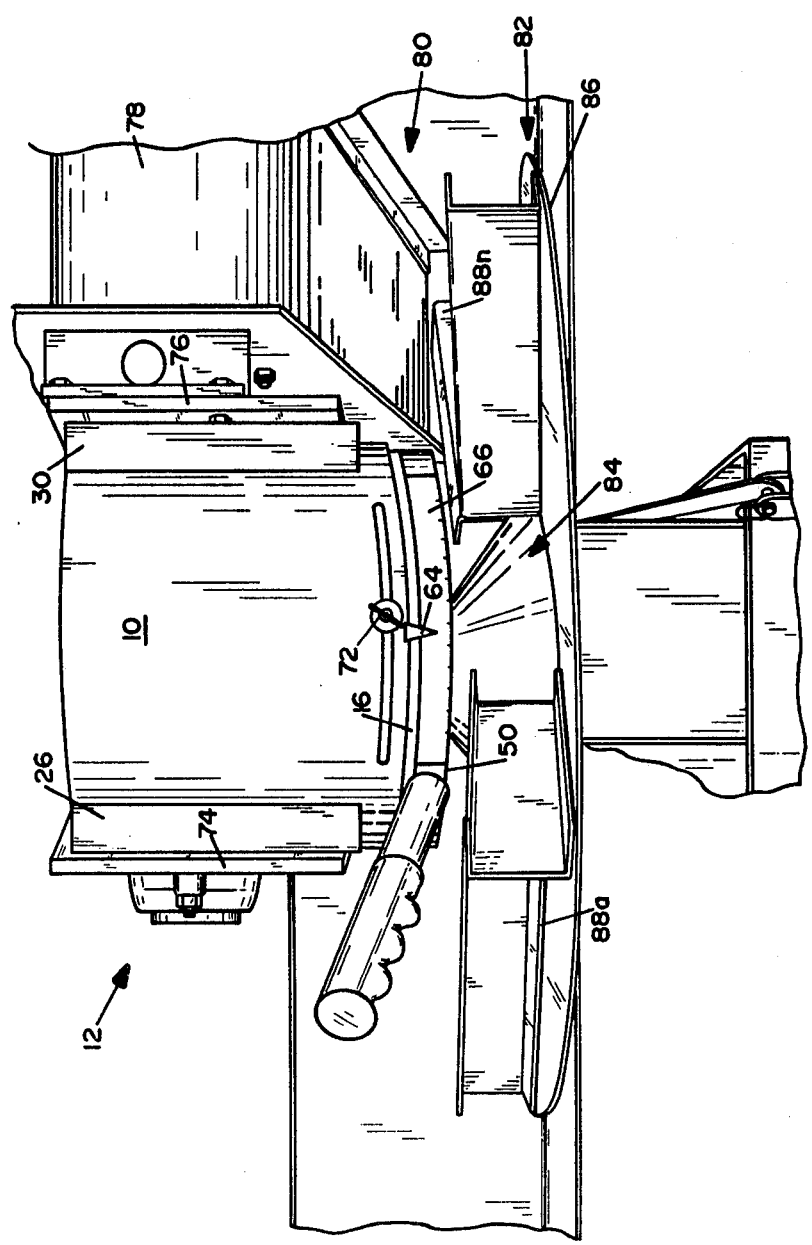
FIG. 3 illustrates a back view of the rotary chute mounted on a spreader, the spreader being a pull-type spreader.
Figure 4:
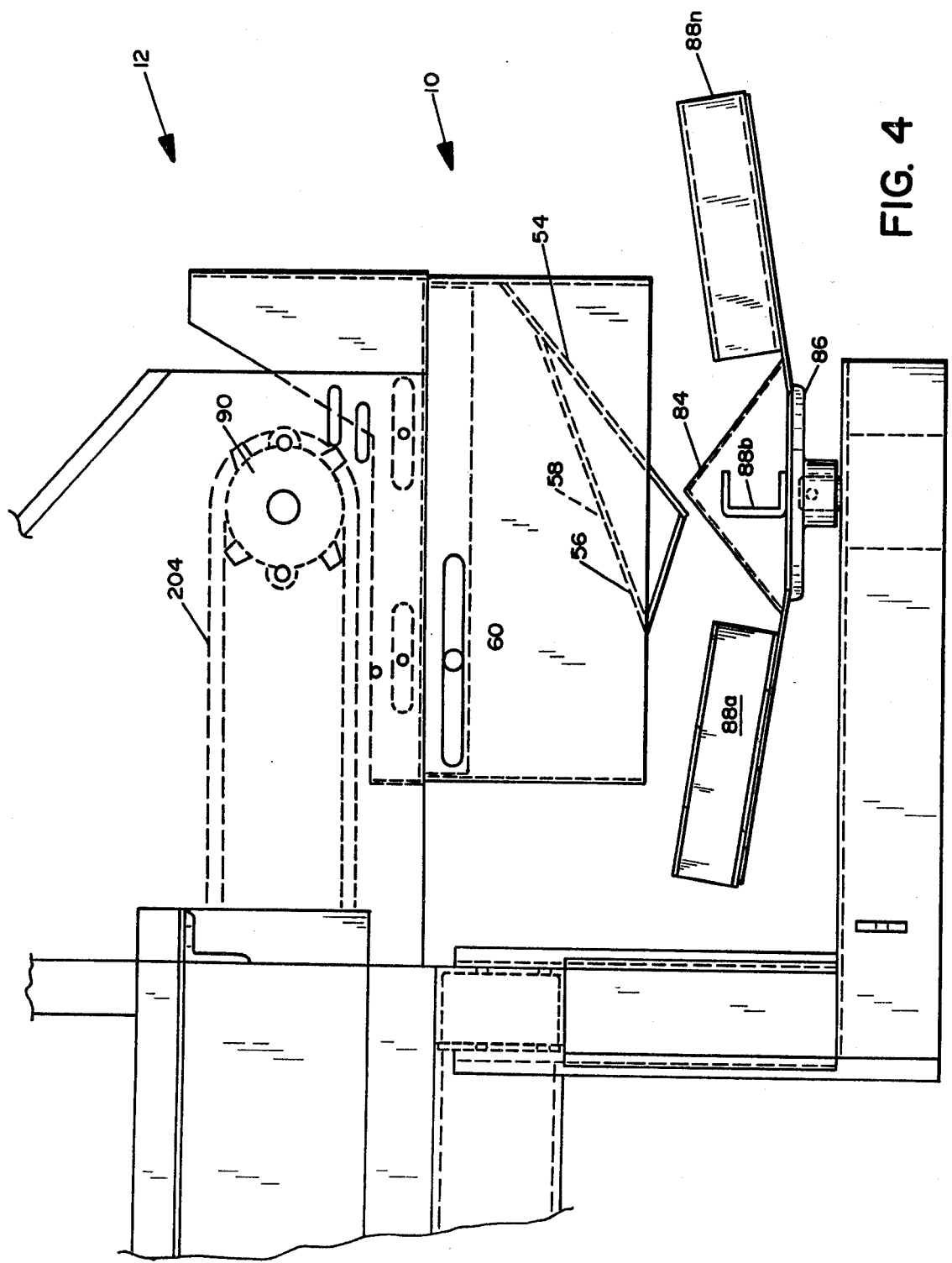
FIG. 4 illustrates a side view of the rotary chute on the pull-type spreader.
Figure 5:
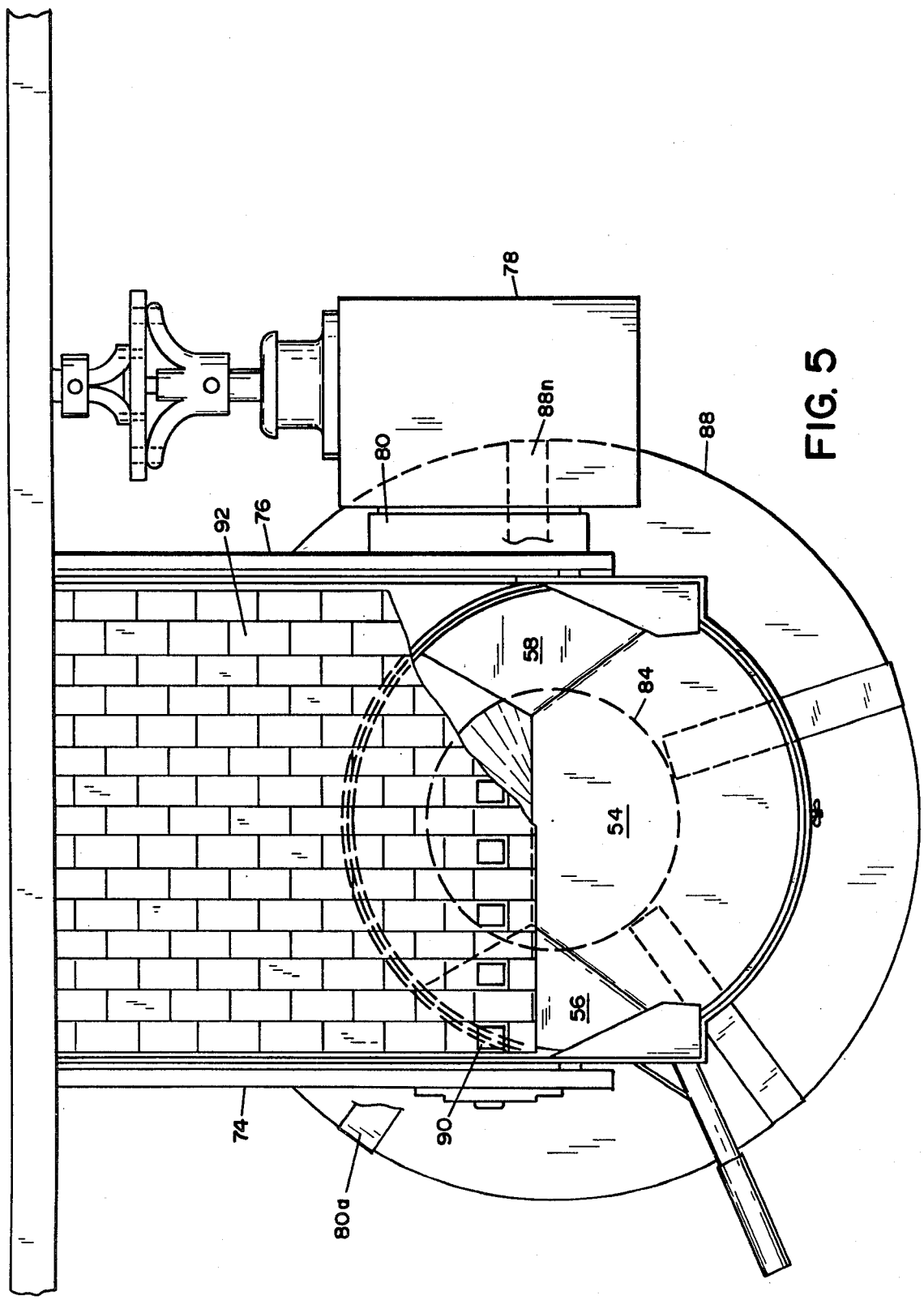
FIG. 5 illustrates a top view of the rotary chute.

FIG. 1 illustrates a front perspective view of an adjustable rotary chute 10 for use on a dry material spreader 12 such as a pull spreader or the like, illustrated in FIG. 4. The adjustable rotary chute includes an upper chute assembly 14 affixed to an outer ring 16 including outer support assembly 24, right-angle member 26, and left-angle member 30 with a partial cylindrical member 28 therebetween. The outer ring 16 includes three elongated longitudinal holes 18, 20 and 22, all of the elongated holes substantially along the same circumferential axis. The upper extension of the outer ring 16 including the partial cylindrical member 28, along with the angle members 26 and 30, can be formed either from individual metal stock or can be one continuous piece of metal including the outer ring 16. Chute extensions 32 and 34 have a trapezoidal configuration affixed at an angle across the angular members 26 and 30. The members 26 and 30 also have angular outer sides in the form of an elongated triangular edge between the top of the members 26 and 30 and the outer ring 16 as illustrated in the figure. Bolt holes 40, 42, 44 and 46 provide for bolting the support members 26 and 30 onto the conveyor extensions 74 and 76 and as illustrated in FIG. 5. The lower chute assembly 48 includes an inner ring 50 which is of a larger vertical height so as to extend below the lower lip of the upper chute assembly 14 and below the lower lip of the outer ring 16. This provides for fastening of the handle 58 as well as handle bracket 60, providing for rotating adjustment as later explained. Affixed to the inner ring is an inner ring partial cylindrical extension 52, to which formed chute baffle 54 as well as baffle extensions 56 and 58 secure between the inner ring 50, the inner ring partial cylindrical extension 52, with respect to the baffle 54 and the baffles 56 and 58 by appropriate welds or spot welds so as to form a continuous structural member with firm-fitting integrity providing a directed down-flow of dry material towards in FIG. 4 a spinner 86 including a spinner cone 84 and vane blades 88a–88n. The chute adjustment handle 60 along with the support bracket 62 secures to the lower lip of the inner ring 50. A plastic handlegrip or the like can be fitted over the handle member 60. In FIG. 3, in the back of the chute 10, a directional indicator pointer 64 affixes to the outer ring 16 with a directional indicator plate 66 affixing to the lower ring 50 as illustrated in FIG. 3. Bolts 68 and 70 provide for rotation between the outer ring 16 and the inner ring 50 while the wing nut bolt assembly 72 provides for frictional engagement with respect to the two rings.

Figure 2:
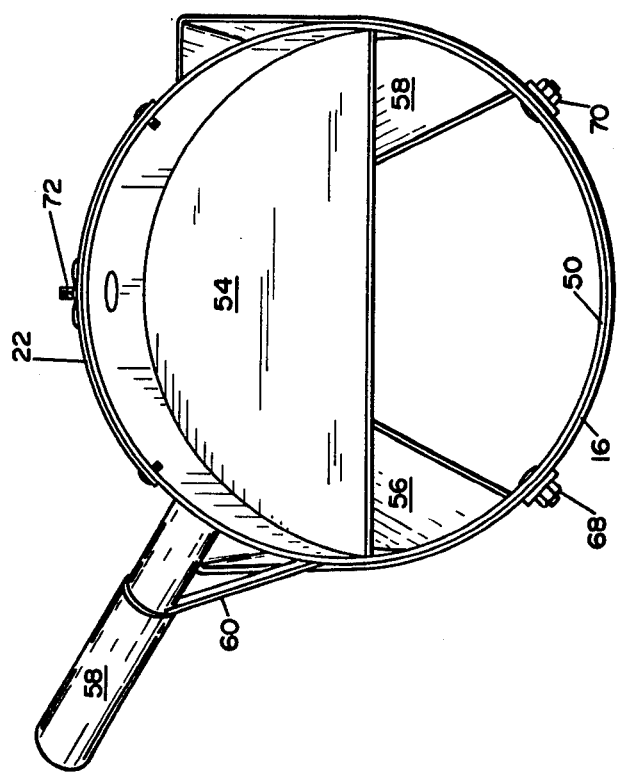
FIG. 2 illustrates a bottom view of FIG. 1.

FIG. 2 illustrates a bottom view of the adjustable rotary chute 10 where all numerals correspond to those elements previously described. Particular note is made of the bottom view of the chute baffle 54 along with the baffles 56 and 58. Particular attention is also pointed out to the nut-and-bolt assemblies 68 and 70 along with wing-nut assembly 72.

FIG. 3 illustrates a back view of the adjustable rotary chute 10 affixed on a spreader 12, spreader 12 including the conveyor left extension 74, the right extension 76, a conveyor gearbox 78 which connects to a gearbox drive shaft, a box end rear 80, a spinner 82 including a conical spinner cone 84 affixed to a substantially circular spinner disc 86 and including a plurality of U-shaped channel spinner vanes 88a–88n. The chute mounts directly behind a rear conveyor chain sprocket 90 driving a conveyor chain or conveyor belt. Appropriate mounting bolts support and bolt the angled members 26 and 30 to the extensions 74 and 76.

FIG. 4 illustrates a side view of the adjustable rotary chute 10 secured on the spreader 12 in partial cross section. The figure also illustrates the relationship of the main baffle 54 and the side baffles 56 and 58 with respect to each other and the spinner cone 84.

FIG. 5 illustrates a top view of the rotary chute 10 looking down onto the spreader and related structure, the spreader wall indicated in this particular instance being a pull type of spreader such as the Dempster "Clipper" although the spreader could also be that of another manufacturer such as that of a vehicle.

MODE OF OPERATION

Adjustable rotary chute 10 is adjusted by moving handle 58 to either side of the wing nut 72 when the wing nut assembly 72 is loosened, providing for sliding between the inner ring 50 and the outer ring 16. This sliding relationship is illustrated by the directional indicator plate as to what degree of angle spreading occurs as the chute baffle 54 and vanes 56 and 58 vary the particular location of downfall of dry material on the spinner cone 84 for subsequent spreading by the plurality of spinner vanes 88a-88n, usually three to six. The degree of adjustment by the handle with respect to the pointer and plates 64 and 66 determines the predetermined geometrical pattern of the dry material as spread. The spinner cone centrally mounted provides for discharge of material from the conveyor belt falling into the chute past the chute baffles 54 and side baffles 56 and 58. The baffles and their particular relationship at their lower edges control the optimized and equalized patterned distribution of the dry material. With the chute centrally and symmetrically positioned over the spinner cone, the swath path would be directly behind the dry material hopper, but would spread to either side depending upon the geometrical orientation of the lower edges of the vanes and baffles. The material which is spread can be fertilizer, salt or any other like material for either agricultural or road use.

DESCRIPTION OF ALTERNATIVE EMBODIMENT

Figure 6:
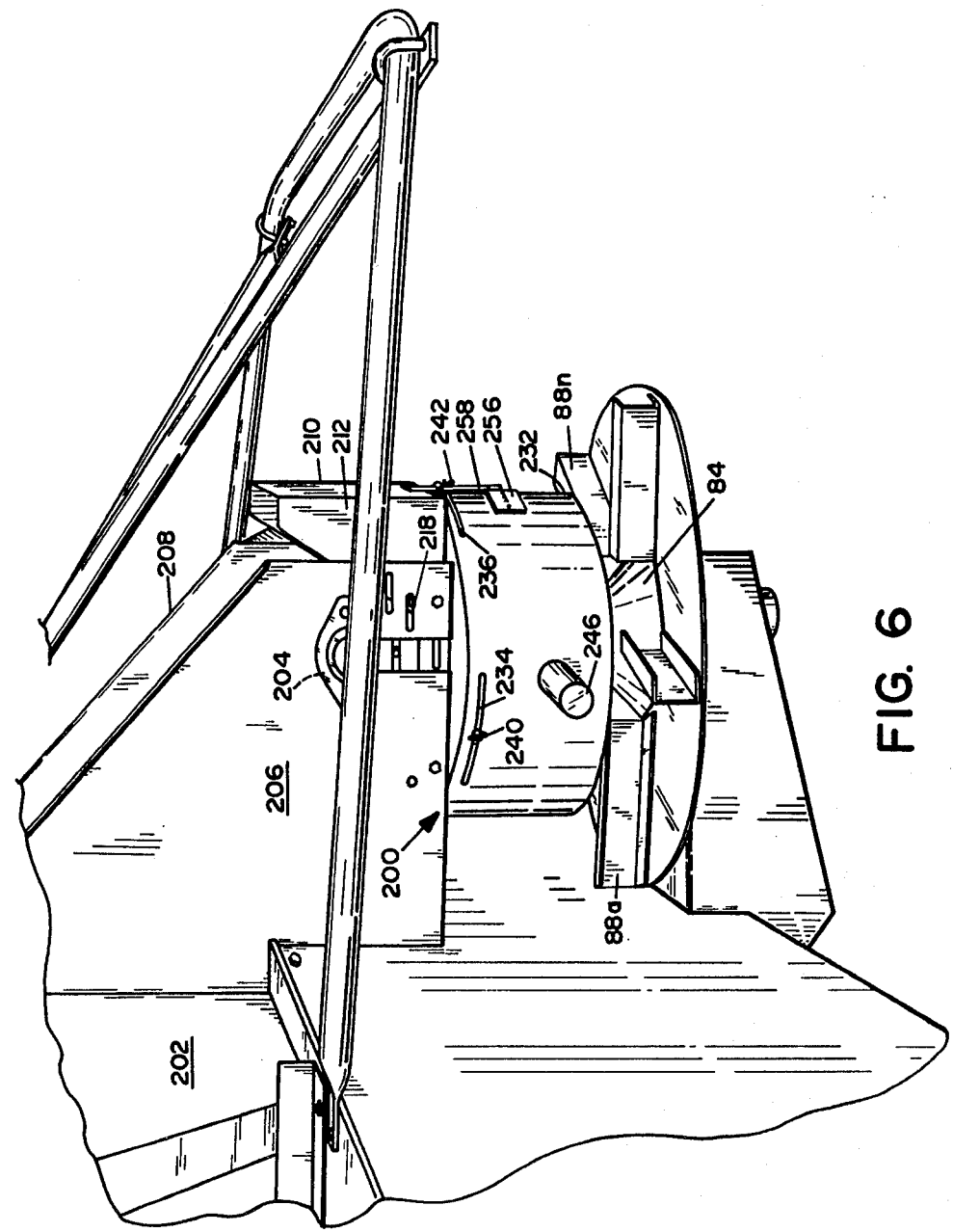
FIG. 6 illustrates a top view of an alternative embodiment of a rotary chute on a truck-mounted spreader.

FIG. 6 illustrates a perspective rear view of a rotary chute 200 for use with a spreader 202 such as a vehicle or truck-mounted spreader or the like. The truck-mounted spreader includes the usual structure of a conveyor chain 204 in a spreader hopper, conveyor extensions left 206 and right 208, and the other associated spinner disc, gearbox and associated structure. The rotary chute 200 includes a frame member 210 bolted to the extensions 206 and 208 with a left side 212, a backplate 214, a right side 216 bolted thereto with nut-and-bolt assemblies 218a-218n. Mounted within the frame 210 is an inner ring 220 of FIG. 8 immediately below a horizontal semi-circular configured plate 222. The plate 222 also includes a second plate 224 having sides 226, 228 and 230 for directing material falling from the conveyor chain onto the baffle. A cylindrical outer ring 232 including three elongated holes on substantially identical axes 234, 236 and 238 rides about the inner ring 220 on nut-and-bolt assemblies including wing nuts 240, 242, and 244. Handles 246 and 248 mounted on opposing sides provide for positioning and hand rotation of the outer ring. A long internal geometrically configured baffle 250 with left-side baffle 252 and right-side baffle 254 are secured therein, preferably through welding or the like. An indicator plate 256 mounts below the middle elongated hole 236 and aligns with a pointer 258 which is secured to the backplate 216 for adjustment of the outer ring carrying the geometrically configured baffles with respect to the spinner cone for predetermined distribution of material in a desired swath.

Figure 7:
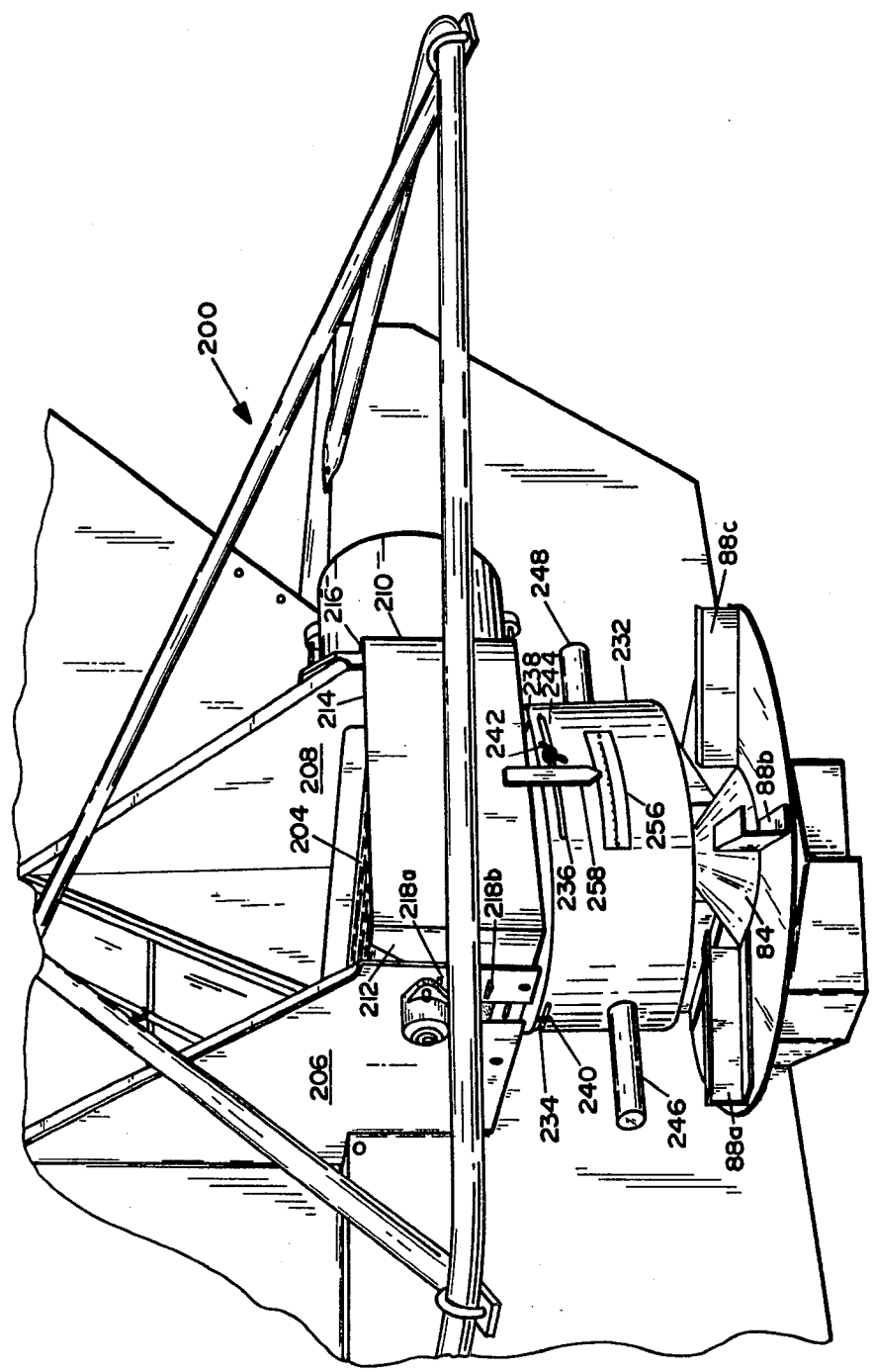
FIG. 7 illustrates a side view of FIG. 6.
Figure 8:
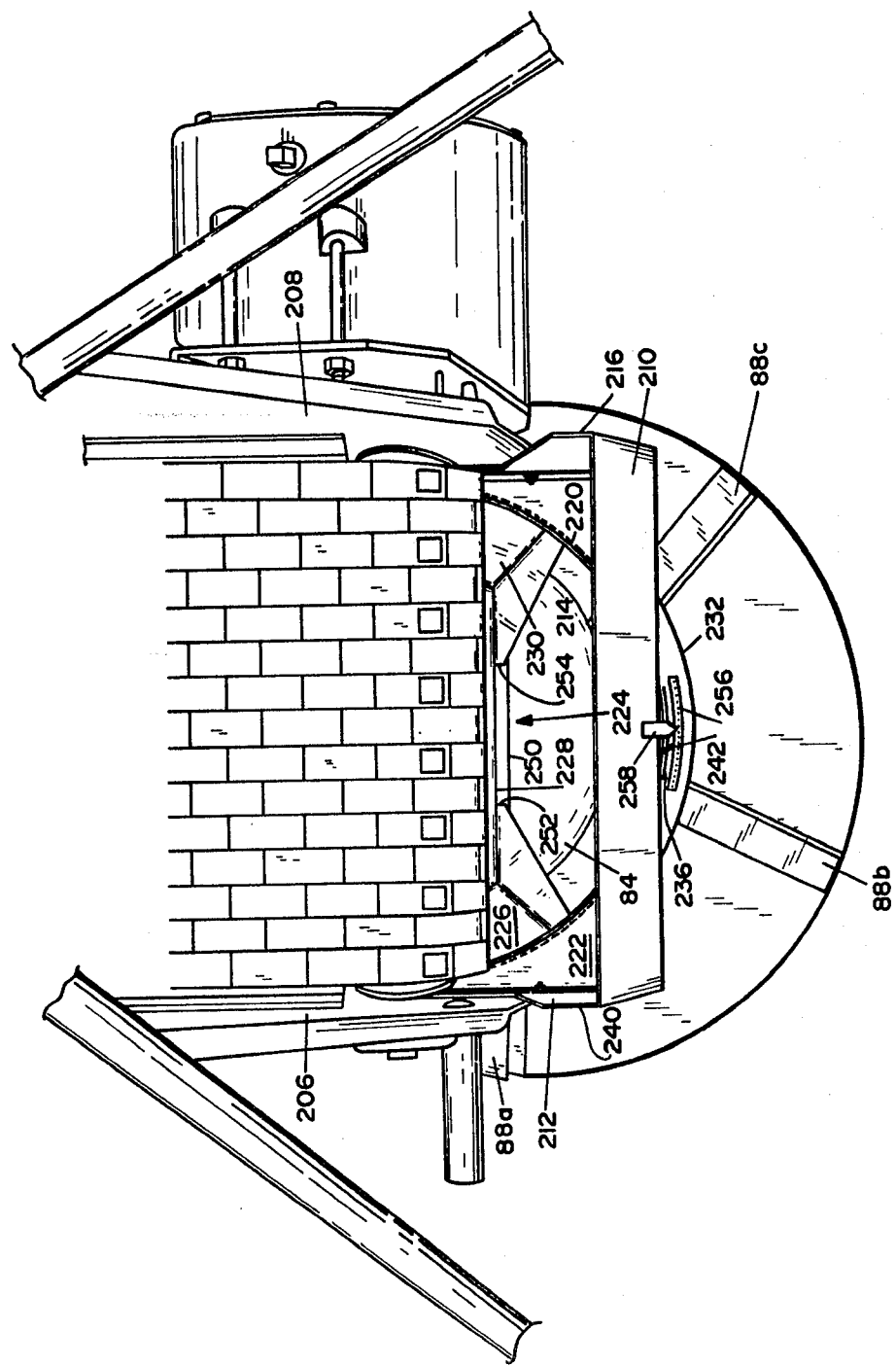
FIG. 8 illustrates a top view.

FIG. 7 illustrates a side view where all numerals correspond to those elements previously described while FIG. 8 illustrates a top view with like numerals for those elements.

The mode of operation of the rotary chute 200 is identical to that of the mode of operation for FIGS. 1-5.

Various modifications can be made to the present invention without departing from the apparent scope thereof. The channel vanes of the spinners can have a rectangular cross section, square cross section, or a semi-circular to circular cross section.

Also, the inner ring could be directly attached and formed into the spreader rear extensions with the outer ring rotating thereabout.

Having thus described the invention, what is claimed is:

1. Rotary chute for use with a spreader having a spinner, the spinner including a conical disc and plurality of spaced spinner blades, said rotary chute comprising:
   a. outer ring means including supporting means affixed thereto for supporting said outer ring means on an end of said spreader, a plurality of elongated rotational support holes spaced about a circumference of said outer ring means, and at least one indicating means on said outer ring means; and,
   b. inner ring means including a circumferential ring member of a larger height than said outer ring means but a lesser diameter than said outer ring means, a like plurality of square-shank holes corresponding to said elongated rotational support means for supporting with nut-and-bolt assemblies said inner ring means within said outer ring means, and at least one baffle means secured to said inner ring means and positioned about an axis of said conical spinner of said spinner disc, handle means positioned on a lower portion of said inner ring menas for adjusting rotationally said inner ring means with respect to said outer ring means, and indicator means including plurality of circumferential marks for indicating angular distribution whereby pattern distribution of dry material spread by said spinner of said spinner through interaction by material directed by said rotary chute thereby provides for predetermined and equalized pattern distribution of dry material from said rotary chute.

2. Rotary chute of claim 1 wherein said baffle means comprises at least one baffle.

3. Rotary chute of claim 1 wherein said baffle means comprises a chute baffle and a side baffle positioned on either side thereof within said inner ring means of said rotary chute.

4. Rotary chute of claim 1 wherein said baffle means distributes dry materials about a spinner.

5. Rotary chute of claim 1 wherein said dry material is fertilizer, road salt, or sand.

6. Rotary chute of claim 1 wherein said handle means comprises at least one handle grip secured to said inner ring means.

7. Rotary chute of claim 1 wherein said rotary chute is field adjustable to a predetermined indicator position.

8. Rotary chute for use with a spreader having a spinner, the spinner including a conical disc and plurality of spaced spinner blades, said rotary chute comprising:
   a. inner ring means including supporting means affixed thereto for supporting said inner ring means on an end of said spreader, a plurality of square support holes spaced about a circumference of said inner ring means, and at least one indicating means on said support ring means; and,
   b. outer ring means including a circumferential ring member of a larger height than said inner ring means and a greater diameter than said inner ring means, a like plurality of elongated rotational support holes corresponding to said square support holes for supporting with nut-and-bolt assemblies said outer ring means about said inner ring means, and at least one baffle means secured to said outer ring means and positioned about an axis of said conical spinner of said spinner disc, handle means positioned on a lower portion of said outer ring means for adjusting rotationally said outer ring means with respect to said inner ring means, and indicator means including plurality of circumferential marks for indicating angular distribution positioned on said outer ring means and aligned with said indicator means whereby pattern distribution of dry material spread by said spinner of said spinner through interaction by material directed by said rotary chute thereby provides for pre-determined and equalized pattern distribution of dry material from said rotary chute.

* * * * *